(12) United States Patent
Kou

(10) Patent No.: US 7,281,290 B1
(45) Date of Patent: Oct. 16, 2007

(54) CLEANING DEVICE FOR OIL DIPSTICKS

(76) Inventor: Min-Lan Kou, 12109 Carlsbad Dr., Austin, TX (US) 78738

( * ) Notice: Subject to any disclaimer, the term of this patent is extended or adjusted under 35 U.S.C. 154(b) by 0 days.

(21) Appl. No.: 11/477,368

(22) Filed: Jun. 30, 2006

(51) Int. Cl.
*A47L 25/00* (2006.01)
(52) U.S. Cl. ...................................... 15/220.4
(58) Field of Classification Search .................. 15/218, 15/218.1, 220.4
See application file for complete search history.

(56) References Cited

U.S. PATENT DOCUMENTS

| 2,470,484 A | * | 5/1949 | Gall | 15/220.4 |
| 2,762,075 A | * | 9/1956 | Bratton | 15/220.4 |
| 4,233,704 A | * | 11/1980 | Sartorio | 15/220.4 |
| 4,380,841 A | * | 4/1983 | Thomas | 15/220.4 |
| 4,658,462 A | * | 4/1987 | Elassar | 15/220.4 |

* cited by examiner

*Primary Examiner*—Mark Spisich
(74) *Attorney, Agent, or Firm*—Rosenberg, Klein & Lee (57) ABSTRACT

A cleaning device for oil dipsticks includes two first parts which are pivotably connected with each other at a mediate portion thereof and a torsion spring is located between the two first parts so that the two handles are wide opened from each other. Each first part has a clamping portion which can clamp the device to a part in the engine room. Each handle has a slot defined therethrough. Two second parts are respectively connected to the two handles, wherein each second part has one end flexibly connected to the handle corresponding thereto. A cleaning member is connected to two respective insides of the two second parts. The two second parts can be pushed toward via the slots to wipe the oil dipstick between the two ends of the cleaning member while the first parts still clamp to the part.

8 Claims, 8 Drawing Sheets

CLEANING DEVICE FOR OIL DIPSTICKS

FIELD OF THE INVENTION

The present invention relates to a cleaning device for vehicle oil dipstick and includes a clamping unit which clamps to a part in the engine room and a cleaning unit is pivotably connected to the cleaning device and can be independently operated while the clamping unit needs not to be removed.

BACKGROUND OF THE INVENTION

Figure 6:
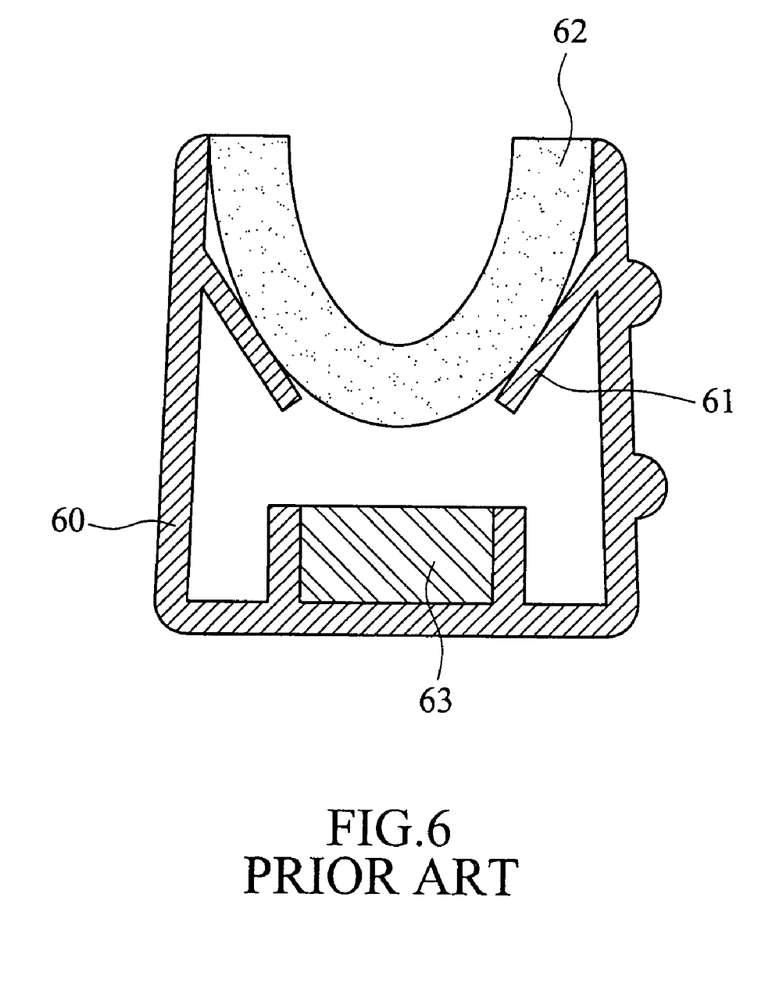
FIG. 6 shows a conventional cleaning device.

A conventional oil dipstick is inserted into the engine casing and dips into the engine oil which should be checked regularly to ensure that the parts of the engine are properly lubricated. When checking the engine oil, the user has to pull the dipstick out from the engine casing and wipe the oil on the dipstick by using a fabric or cotton piece, and then insert the dipstick again and then pull it out to check the actual level of the engine oil on the dipstick. It is noted that when the drivers want to check the engine oil. After use, the fabric was put randomly because there is no proper place for storage of the fabric. Often, the fabric cannot be found when needed. FIG. 6 discloses a conventional cleaning device for oil dipstick and includes a U-shaped frame 60 which includes an open top and two sidewalls which are flexible and can be squeezed inward. Each sidewall includes a support plate 61 extending from an inside thereof and a cleaning member 62 is engaged on the two support plates 61 so that when the user squeezes the two sidewalls, the cleaning member 62 is curved and clamps the oil dipstick. A magnet 63 is connected to an inner end of the frame so that the device can be attached on any metal part in the engine room and can be found when needed. However, the magnet 63 cannot firmly hold the cleaning device in the engine room and may drop from the metal part because of shaking or vibrating.

Figure 7:
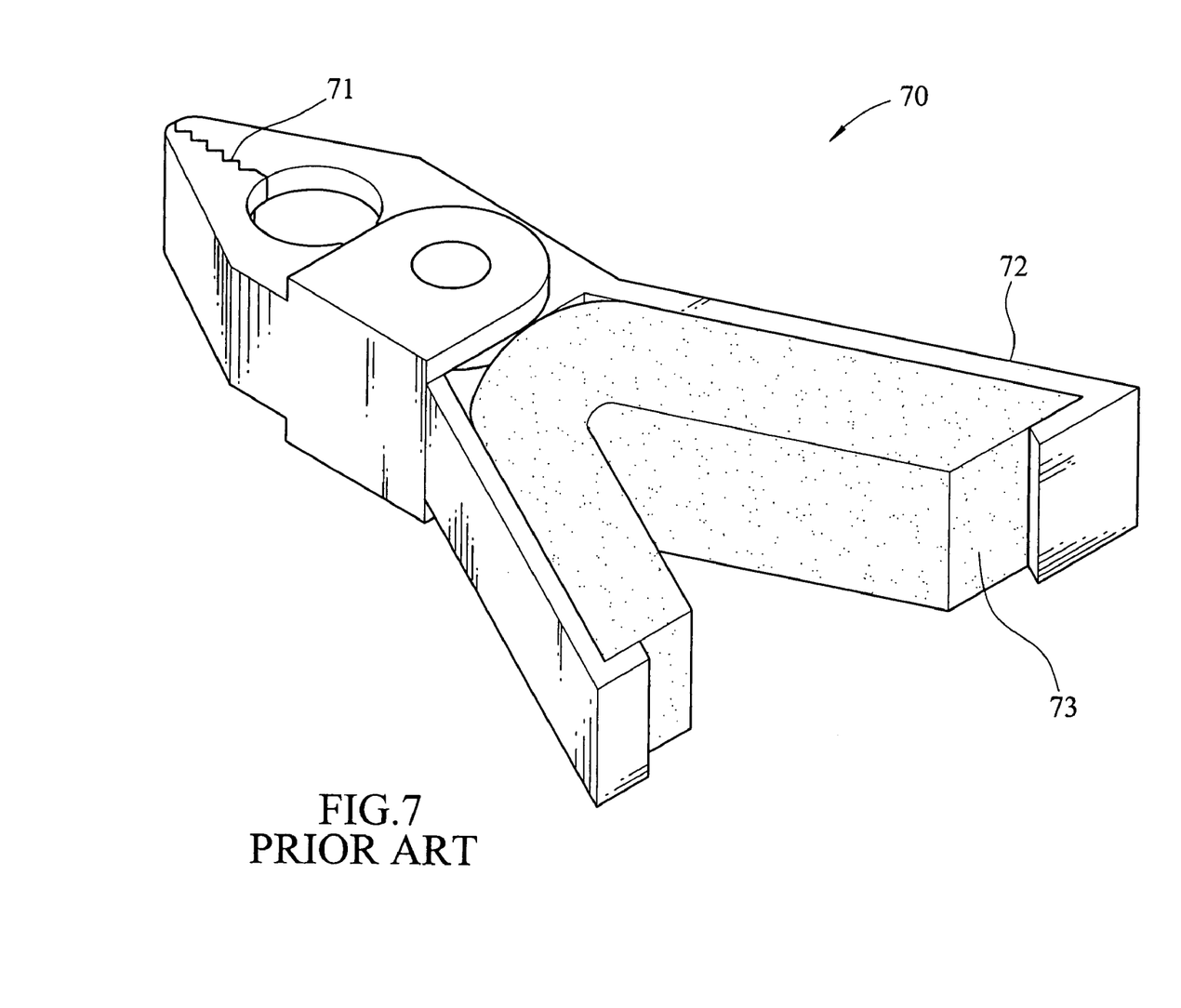
FIG. 7 shows a perspective view of another conventional cleaning device.
Figure 8:
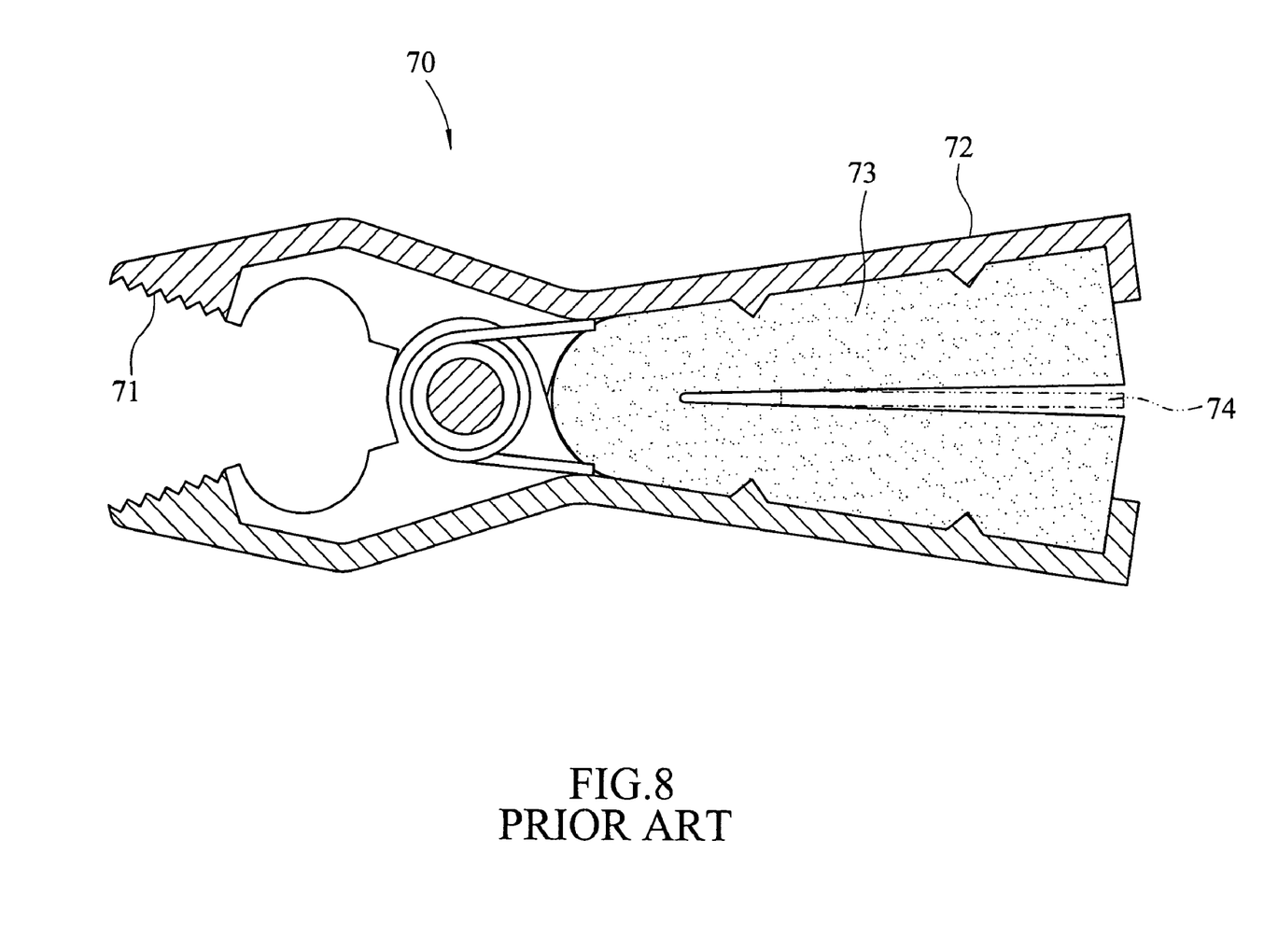
FIG. 8 shows that the dipstick is clamped by the sponge member of the conventional cleaning device.

FIGS. 7 and 8 show another cleaning device which is disclosed in U.S. patent application Ser. No. 11/179,571, now abandoned. The cleaning device includes a clamp device 70 which includes two parts pivotably connected with each other and a spring is connected between the two grips 72 of the two parts. Each part has a serration inside 71 so that the cleaning device 70 may clamp on a part in the engine room and a sponge member 73 is connected to the two respective insides of the two grips 72 so that the user can remove the clamp device 70 from the part and arrange the oil dipstick 74 between the two grips 72. The two grips 72 are then pulled toward each other to wipe the oil on the oil dipstick 74. The clamp device 70 then clamps to any part after use.

The present invention intends to provide a cleaning device for oil dipstick and the device does not need to be removed from the place where it is clamped and the cleaning unit of the cleaning device can be used independently.

SUMMARY OF THE INVENTION

The present invention relates to a cleaning device for oil dipsticks and includes a clamping unit which comprises two first parts and each first part has a clamping portion defined in an inside of a first end thereof and a handle is located at a second end of each of the first parts. The two first parts are pivotably connected with each other at a mediate portion thereof and a torsion spring is located between the two first parts so as to normally keep the two handles to be wide opened from each other. A cleaning unit includes two second parts which are respectively connected to the two handles. Each second part has one end flexibly connected to the handle corresponding thereto, and a cleaning member is connected to two respective insides of the two second parts.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
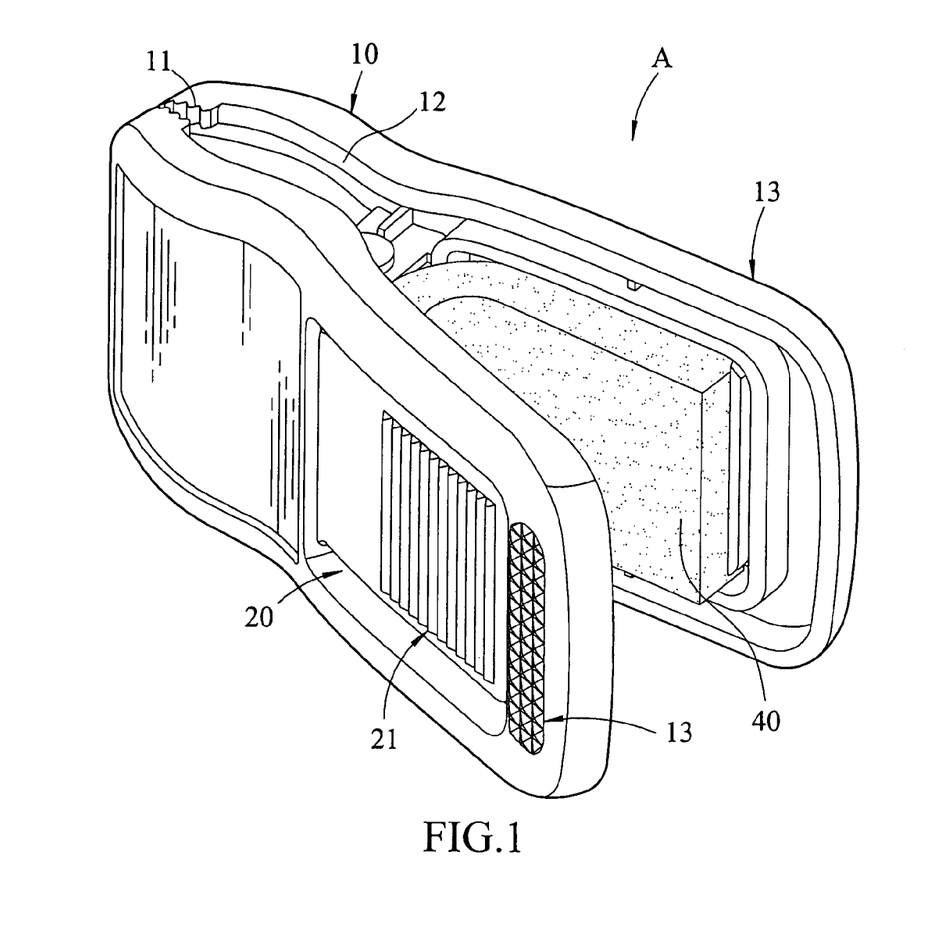
FIG. 1 is a perspective view of the cleaning device of the present invention.
Figure 2:
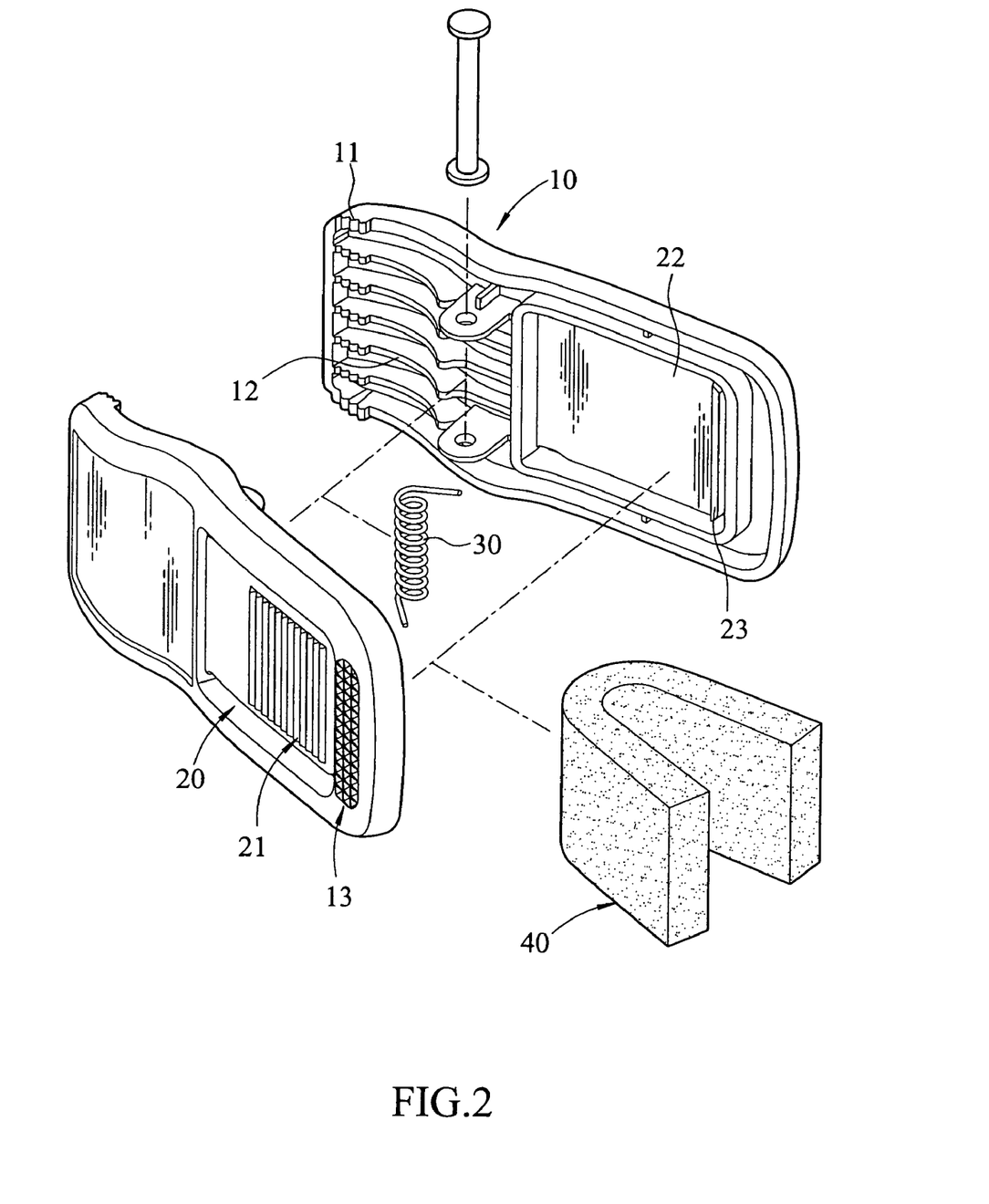
FIG. 2 is an exploded view to show the cleaning device of the present invention.
Figure 3:
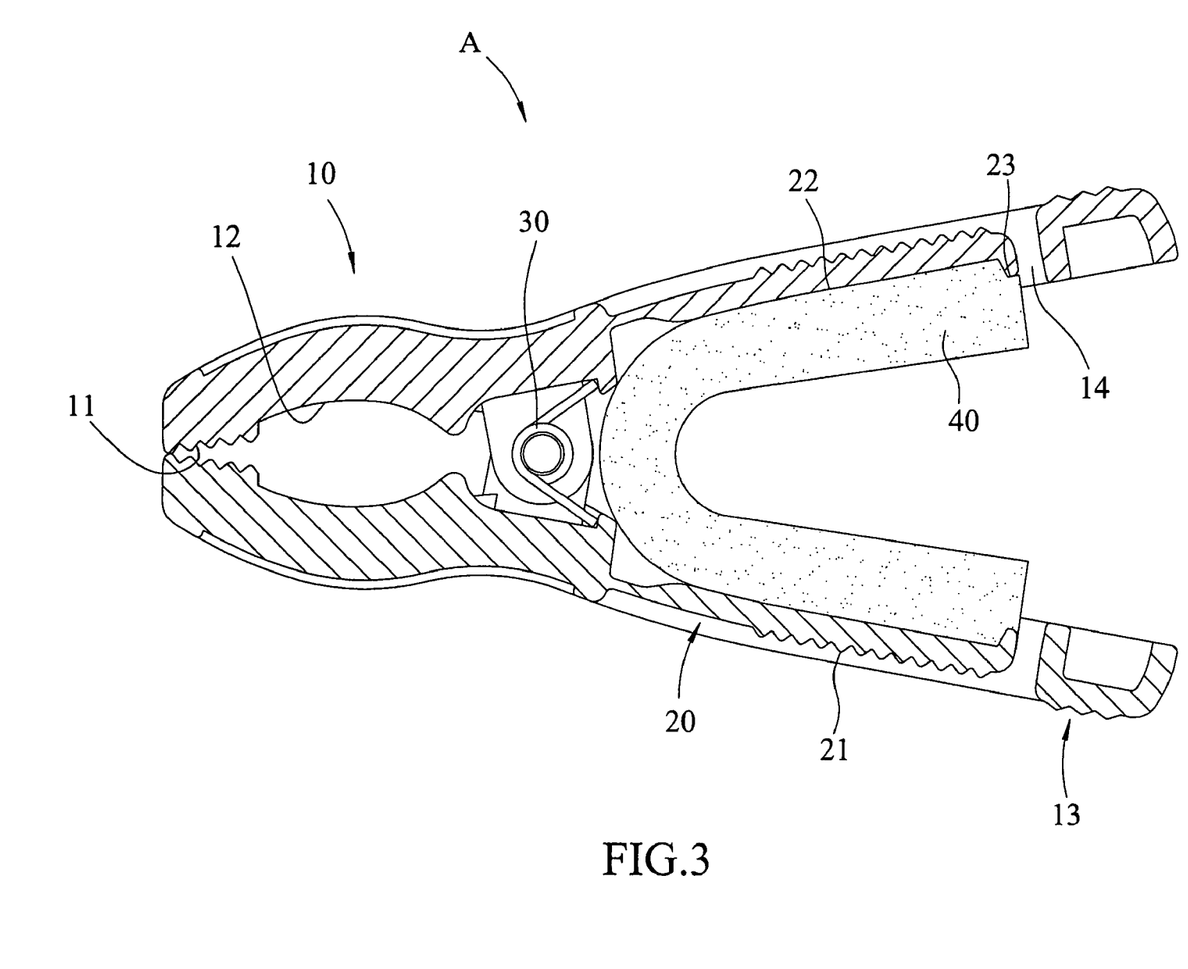
FIG. 3 is a cross sectional view of the cleaning device of the present invention.

Referring to FIGS. 1 to 3, the cleaning device "A" for oil dipsticks 50 of the present invention comprises a clamping unit comprising two first parts 10 and each first part 10 has a serrated clamping portion 11 defined in an inside of a first end thereof and a handle 13 is located at a second end of each of the first parts 10. A plurality of ridges 12 extend from the inside of each of the first parts 10 and each ridge 12 has a curved and concaved portion so as to form a space by the ridges 12. Each of the two first parts 10 has two lugs extending from a mediate portion thereof and a pin extends through the lugs of the two first parts 10. A torsion spring 30 is mounted to the pin and two legs of the torsion spring 30 contact the two first handles 13, so that the two handles 13 are normally kept to be wide opened from each other. Each of the two handles 13 of the first parts 10 has a slot 14 defined therethrough.

A cleaning unit 20 includes two second parts 21 which are respectively connected to the two handles 13. Each second part 21 has one end flexibly connected to the handle 13 corresponding thereto and a cleaning member 40 is connected to two respective insides of the two second parts 21. Each of the two second parts 21 has a recess 22 defined in the inside thereof and two ends of the cleaning member 40 are engaged with the two recesses 22 of the two second parts 21. Each of the two recesses 22 has a stop 23 extending from an inner end thereof and the two ends of the cleaning member 40 are positioned by the two stops 23. The two second parts 21 can be accessible from outside of the two handles 13 via the slots 14.

Figure 4:
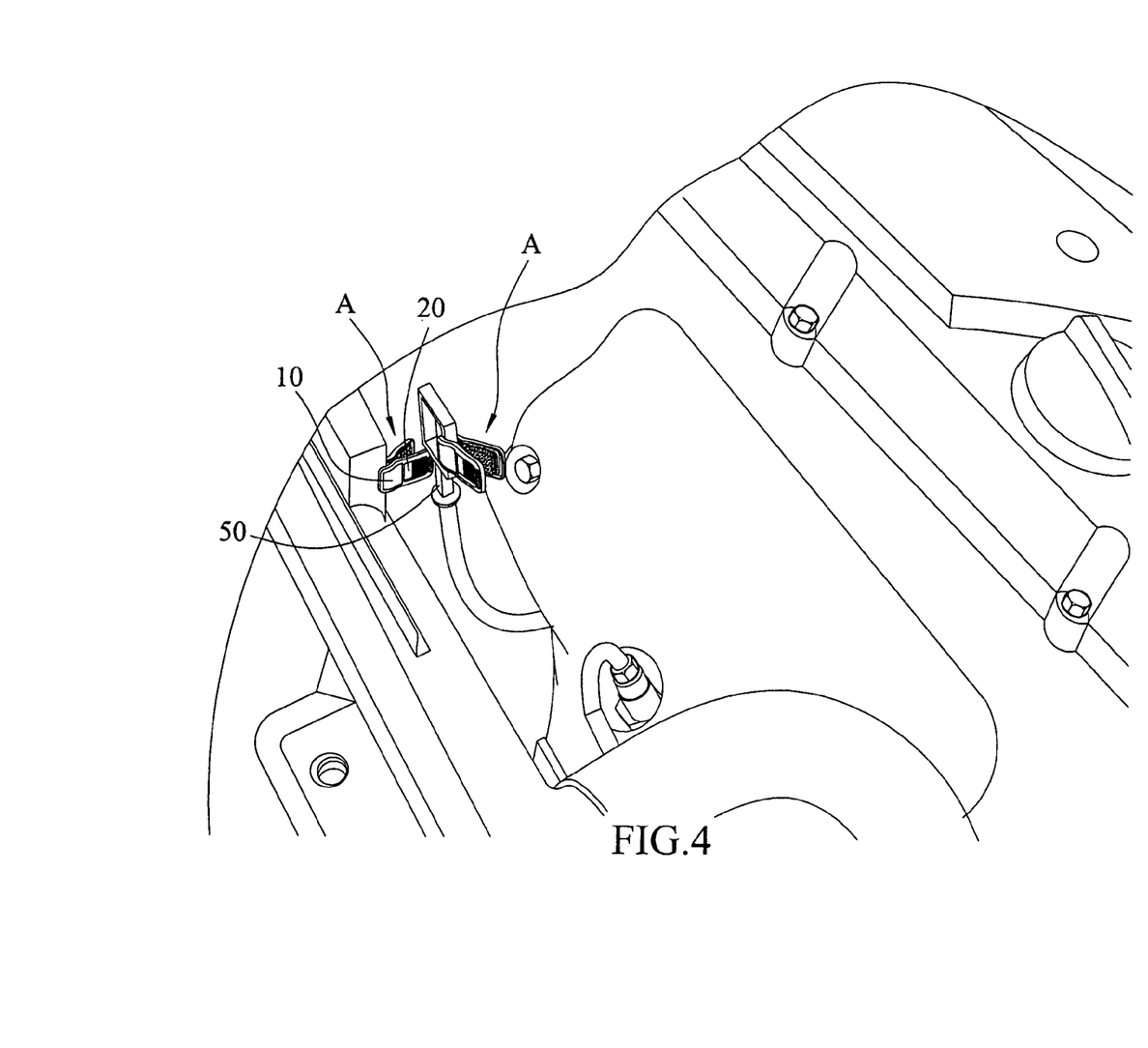
FIG. 4 shows that two cleaning devices clamp to two parts in the engine room.
Figure 5:
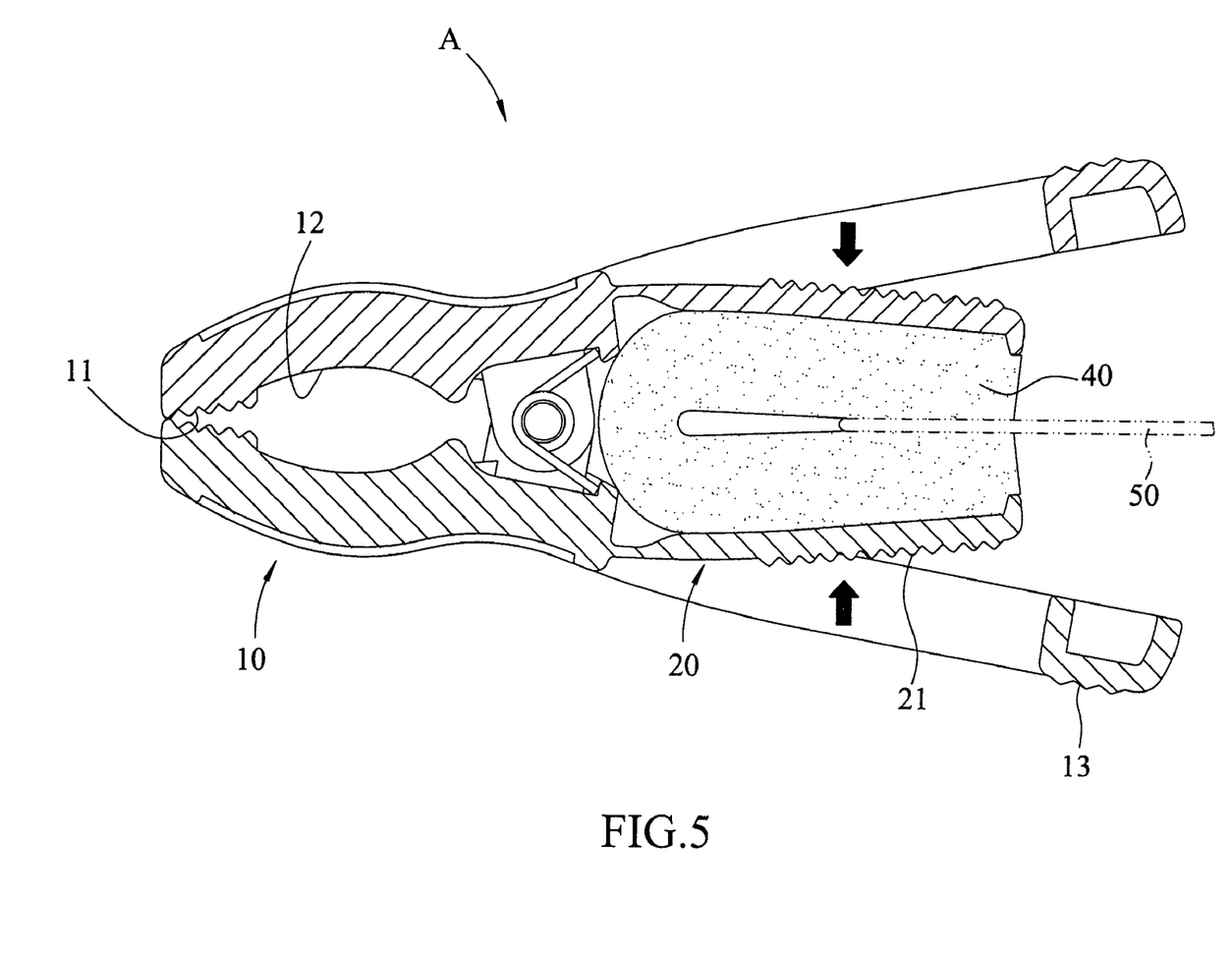
FIG. 5 is a cross sectional view of the cleaning device of the present invention, wherein the oil dipstick is clamped by the cleaning member.

Referring to FIGS. 4 and 5, the clamping unit of the cleaning device "A" can easily clamp to any part in the engine room and the oil dipstick 50 is then pulled out from the engine and located between the two ends of the U-shaped cleaning member 40. The user then insert fingers through the slots 14 to push the two second parts 21 toward each other such that the oil dipstick 50 is wiped by the cleaning member 40 when pulling the oil dipstick 50. It is noted that the cleaning device "A" does not need to be removed from the place where the clamping unit clamps during the cleaning process of the oil dipstick 50. The cleaning member 40 can be made by any proper material such as a piece of fabric or a piece of wool fabric.

While we have shown and described the embodiment in accordance with the present invention, it should be clear to those skilled in the art that further embodiments may be made without departing from the scope of the present invention.

What is claimed is:

1. A cleaning device for oil dipsticks, comprising:
   a clamping unit comprising two first parts, each first part having a clamping portion defined in an inside of a first end thereof and a handle located at a second end of each of the first parts, the two first parts pivotably connected with each other at a mediate portion thereof and a torsion spring located between the two first parts for normally keeping the two handles to be wide opened from each other, and
   a cleaning unit including two second parts which are respectively connected to the two handles, each second part having one end flexibly connected to the handle corresponding thereto, a cleaning member connected to two respective insides of the two second parts.

2. The device as claimed in claim 1, wherein each of the first parts includes a plurality of ridges extending from the inside thereof and each ridge has a curved and concaved portion so as to form a space by the ridges on the two first parts.

3. The device as claimed in claim 1, wherein each of the two handles of the first parts has a slot defined therethrough and the two second parts are accessible from outside of the two handles via the slots.

4. The device as claimed in claim 1, wherein each of the two second parts has a recess defined in the inside thereof and two ends of the cleaning member are engaged with the two recesses of the two second parts.

5. The device as claimed in claim 4, wherein each of the two recesses has a stop extending from an inner end thereof and the two ends of the cleaning member are positioned by the two stops.

6. The device as claimed in claim 1, wherein each of the two first parts has two lugs extending from a mediate portion thereof and a pin extends through the lugs of the two first parts, the torsion spring is mounted to the pin and two legs of the torsion spring contact the two first handles.

7. The device as claimed in claim 1, wherein the cleaning member is a piece of fabric.

8. The device as claimed in claim 1, wherein the cleaning member is a piece of wool fabric.

\* \* \* \* \*